United States Patent [19]

Tanaka

[11] Patent Number: 4,674,866
[45] Date of Patent: Jun. 23, 1987

[54] METHOD AND APPARATUS FOR TWO-SIDE IMAGE FORMATION

[75] Inventor: Hidetoshi Tanaka, Yokohama, Japan

[73] Assignee: Canon Kabushiki Kaisha, Tokyo, Japan

[21] Appl. No.: 650,265

[22] Filed: Sep. 13, 1984

[30] Foreign Application Priority Data

Sep. 16, 1983 [JP] Japan .................. 58-170956
Aug. 10, 1984 [JP] Japan .................. 59-168633

[51] Int. Cl.⁴ .......................................... G03G 21/00
[52] U.S. Cl. .............................. 355/23; 355/3 SH; 355/14 SH; 355/24; 271/3.1; 271/4
[58] Field of Search .............. 355/3 SH, 14 SH, 24; 271/3.1, 4

[56] References Cited

U.S. PATENT DOCUMENTS

| | | | |
|---|---|---|---|
| 4,190,354 | 2/1980 | Smith et al. | 355/24 |
| 4,466,733 | 8/1984 | Pels | 355/24 |
| 4,468,114 | 8/1984 | Pels et al. | 355/24 |

Primary Examiner—A. T. Grimley
Assistant Examiner—David Warren
Attorney, Agent, or Firm—Fitzpatrick, Cella, Harper & Scinto

[57] ABSTRACT

The invention relates to a method and apparatus for forming images on both sides or surfaces of sheets corresponding to images on two-side originals.

In a method for two-side image formation for forming images on both sides of sheets from images formed on two-side originals, a first-side image formation cycle is continuously performed for a required number of sets of sheets, the first-side image formation cycle including sequential operations for forming images on the first sides of the originals on the first sides of the sheets and for storing the one-side copied sheets in an intermediate storing portion, and thereafter a second-side image formation cycle is performed by sequentially forming images of the second sides of the originals on the second sides of the corresponding sheets. The invention also relates to an apparatus adopting this method.

8 Claims, 20 Drawing Figures

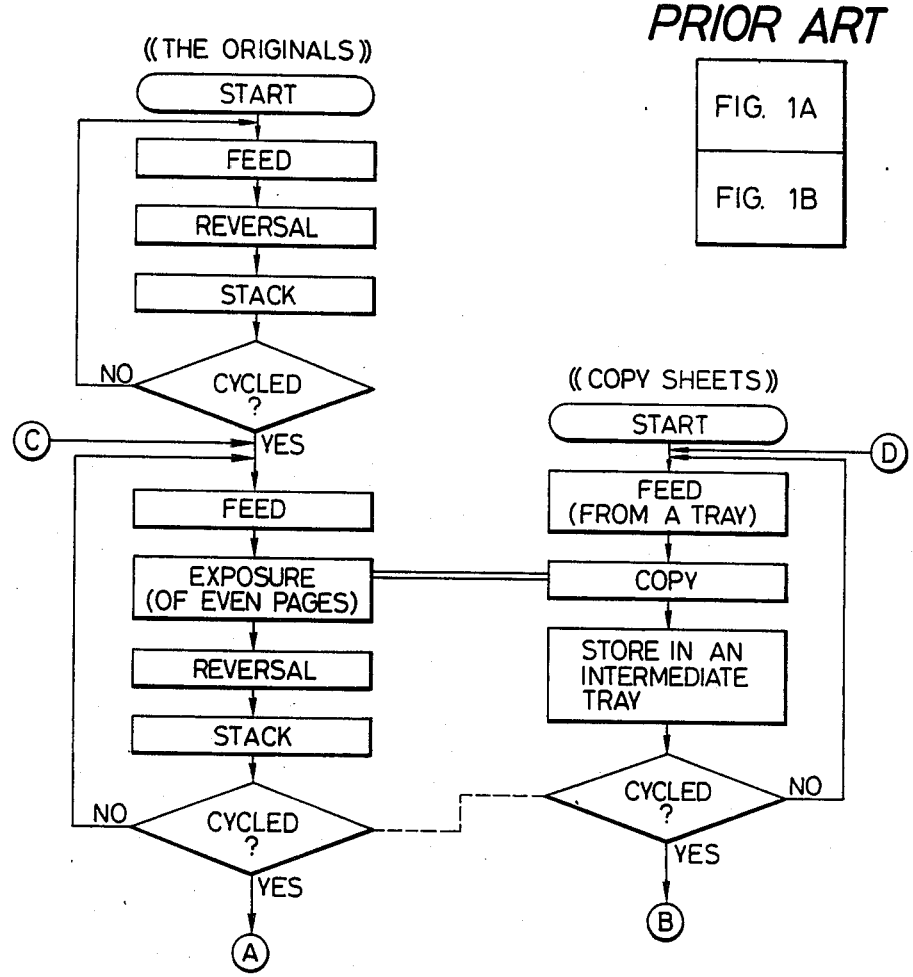

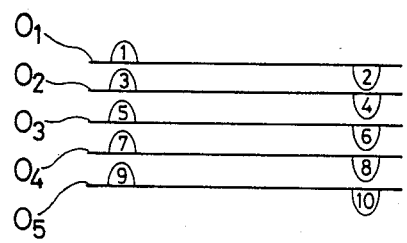
FIG. 2A
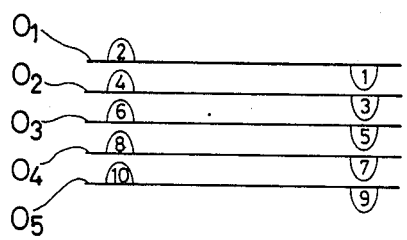
FIG. 2B
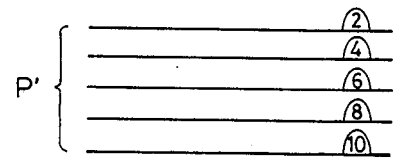
FIG. 3A
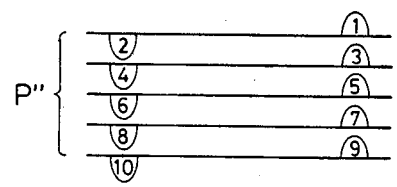
FIG. 3B
FIG. 3C
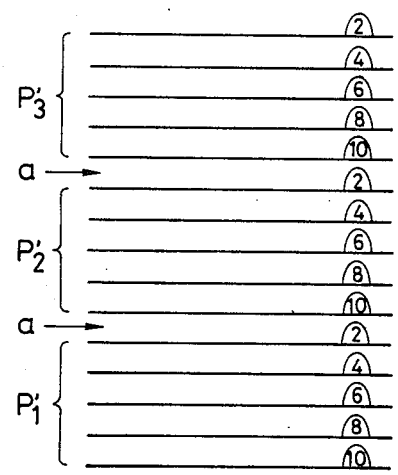

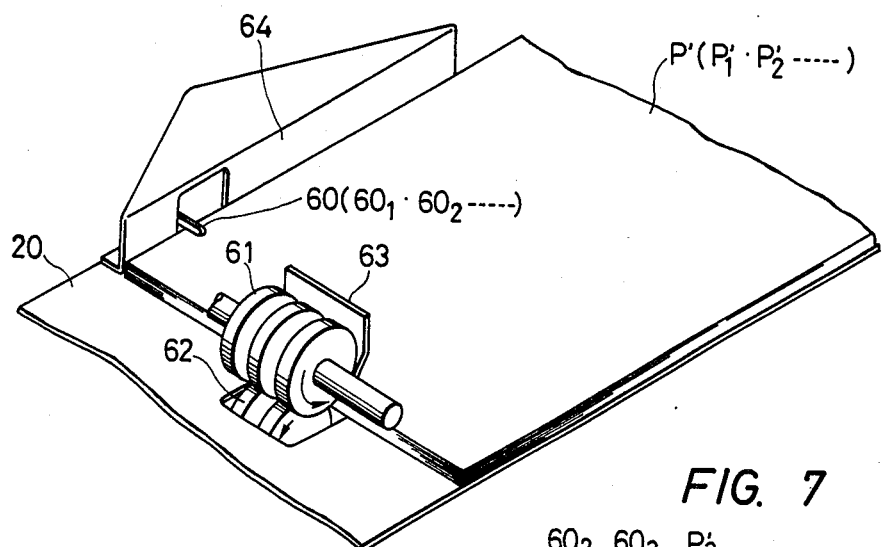
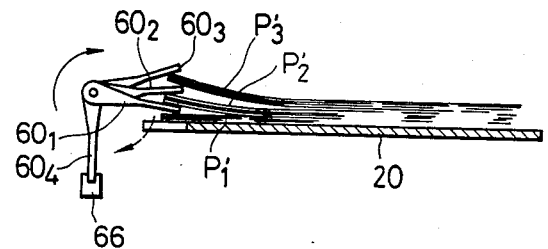
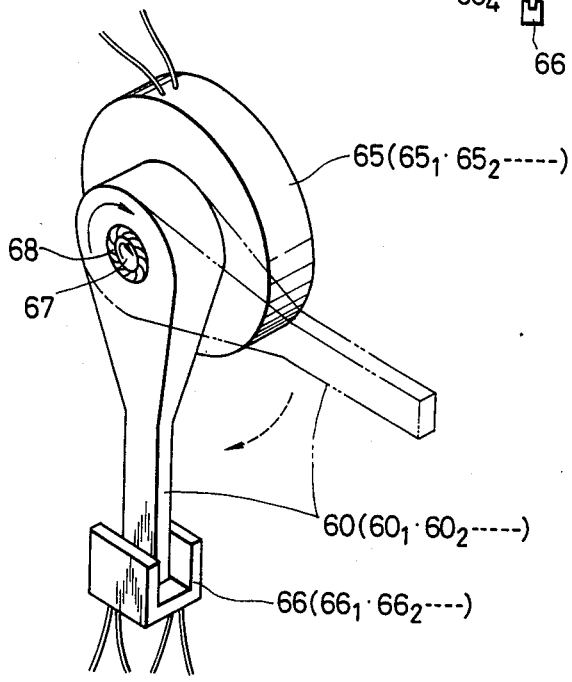
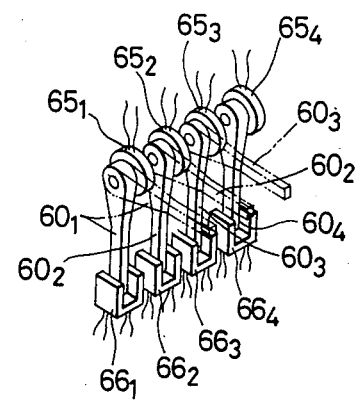

METHOD AND APPARATUS FOR TWO-SIDE IMAGE FORMATION

BACKGROUND OF THE INVENTION

1. Field of the Invention

The present invention relates to a method and apparatus for forming images on both sides of a sheet corresponding to images on two sides of an original.

In the present invention, known image formation processes such as electrostatic recording methods or electrophotographic processes may be adopted. Furthermore, in accordance with the present invention, the material of the original or a sheet is not limited to paper but may be a resin such as a plastic or a metal. The present invention is not limited to an electrophotographic copying machine and can be applied to known image formation apparatuses such as laser beam printers or image recording apparatuses. In the present invention, the method of reading an image of the original is not limited to one wherein the original surface is exposed and an image of reflected light is directly guided. For example, known methods may be adopted including a method of converting image information into an electrical signal.

2. Description of the Prior Art

An example of an electronic copying machine will be described below.

In a conventional machine, in a mode for preparing a plurality of sets of sheets with images copied on both surfaces thereof corresponding to images on a set of a plurality of the originals each having images on the two sides thereof, the copy sequence and the circulation order of the originals are performed by the following first and second methods:

(a) First Method

According to this method, copying of images on two sides of sheets is performed one by one for each of a set of a plurality of the originals having images on two sides thereof. To describe an example, in order to perform two-side copy of a set of 5 originals (10 pages), the fifth original is fed from an original table onto an original glass table so as to copy the image of the 10th page on the first side of the sheet. The same sheet is reversed and is fed again onto the original glass table to copy the image of the 9th page on the second side of the sheet. Thus, the copying operation for the fifth original is completed. The original is reversed again and is returned to the original table. The same operation is repeated for the fourth to the first originals so as to produce a set of five copies corresponding to the five originals. In order to obtain a plurality of sets of such five copies, the entire copy cycle is performed a required number of times.

This method allows sequential two-side copy for each of the originals to be copied. Therefore, this method is effective when the number of sheets is small. However, when the number of sheets is increased, the copying time is increased. Furthermore, the number of reversal of the originals is $2n \times m$ where n is the number of the two-side originals and m is the number of sets of copies to be produced. If a sheet reversing mechanism is included at the side of a copying machine, the total number of reversal of the originals can be decreased to half, i.e., $n \times m$. However, since this technique is not directly related to the present invention, it will not be described here. In any case, this method has a problem of slow operation as described above. In addition, since the originals are reversed a number of times, the originals are subject to damage. If an automatic recycle draft feeder (RDF) is used, it must have an automatic original reversing mechanism, resulting in a large and complex system.

(b) Second Method

According to this method, even pages (or odd pages) of a set of two-side originals are copied. The even page copied sheets are stored in an intermediate tray. Thereafter, the odd pages of the originals are sequentially copied on the other side of the corresponding copies. When this method is described with reference to the same case of a set of 5 two-side originals, the fifth original is fed from the original table onto the original glass table to copy the image of the 10th page. Then, the original is reversed and is returned to the original glass table. After that, the fourth original is fed and the image of the 8th page is copied. Subsequently, the images on the 6th, 4th and 2nd pages of the third to the first originals are copied. The copies of even pages are all stored in the intermediate tray. The respective originals are reversed, and are returned to the original table. The fifth original which has been reversed and stored is fed onto the original glass table so as to copy the image on the 9th page onto the second side of the copy having the first side on which the image of the 10th page is copied. The original is reversed and is returned to the original table. Likewise, the copy operations of the 7th, 5th, 3rd and 1st pages are performed on the second sides of the copies each having the first side with the respective even page image. In this manner, a set of five two-side copies corresponding to the originals is produced.

In this method, since the originals are all reversed and are returned, when the copy cycle is completed, all the originals have been returned onto the original table in the same order as prior to the copying cycle. When a plurality of sets of copies must be produced, the above operations are repeated a required number of times.

FIG. 1 is a flow chart showing the relationship between the originals and sheets for performing the two-side copy by the second method. The originals $O_1$ to $O_5$ are placed on the original table to increase in page number downward, as shown in FIG. 2A. The originals stacked in this manner are sequentially supplied onto the original glass table from the lowermost original $O_5$. The original $O_5$ is passed along the glass table without performing exposure and is conveyed into an original return sheet path mechanism. After a switch back sheet path, the original is reversed and is returned onto the original table again. When this operation is performed once for all of the originals, the originals $O_1$ to $O_5$ are now in the order as shown in FIG. 2B. Then, when the lowermost original is fed onto the original glass table, the 10th page (even page) as the final page faces the original glass table. When the copy operation for the 10th page is completed, the sheet (on one side of which an image is copied) is stored in the intermediate tray. After the exposure operation is completed, the original is reversed and is returned onto the original table. When this operation is performed once for each of the originals, five copies P' each having even page image copied on the first side are stacked in the order as shown in FIG. 3A. The originals have been returned onto original table 2 in the order as shown in FIG. 2A. When the originals are then supplied from the lowermost one onto the original glass table, the 9th page as the last page among the odd pages faces the original glass table.

The image on the 9th page is copied on the lowermost sheet fed from the intermediate tray, that is, on the second side of the sheet having the image of the 10th page formed on one side thereof. The copy sheet obtained (a two-side copy of 9th and 10th pages of the original) is discharged. When this operation is performed for a full cycle (until all the copies P' in the intermediate tray are fed), a set of 5 two-side copies P" are stacked in the page order as shown in FIG. 3C. Meanwhile, the originals have been returned onto the original table in the page order as shown in FIG. 2B.

When the above operation is repeated the number of times corresponding to the number of sets of copies to be required, a required or ordered number of sets of two-side copies can be produced.

According to this second method, the copying time can be shortened as compared to the first method. However, the number of reversal of the originals in the case described above is at least 2 n×m where n is the number of two-side originals to be copies and m is the number of sets of n copies to be produced.

When the last set of copies is produced in the case described above, the originals on the original table are in the state as shown in FIG. 2B. Therefore, the originals must be fed again to return the page order to that shown in FIG. 2A. However, when the originals are returned after exposure of the final odd H) pages without reversal, this final reversal operation can be omitted.

Also, if a sheet reversing mechanism is included at the side of a copying machine, the total number of reversal of the originals can be decreased to half i.e., n×m.

In the case according to the second method, the number of reversal of the originals is also many, and the originals may be jammed or damaged frequently. An automatic recycle original feeder must be used together with an automatic reversing mechanism, also resulting in a large and complex system.

Although the first and the second methods each are described with the single example above, various different procedures are known with respect to the page order (from smaller or larger pages, from even pages or odd pages, etc,) or the reversal positions of the originals.

SUMMARY OF THE INVENTION

It is an object of the present invention to provide a method and apparatus for two-side image formation, which allows fast two-side image formation It is another object of the present invention to provide a method and apparatus for two-side image formation, which allows simple two-side image formation.

It is still another object of the present invention to provide a method and apparatus for two-side image formation, which can reduce the number of reversals of the originals.

It is still another object of the present invention to provide a method and apparatus for two-side image formation, which may reduce the frequency of the damaging originals.

It is still another object of the present invention to provide an improved method and apparatus for two-side image formation, which requires only a small number of reversal operations of the originals, so that with an automatic recycle original feeder not having an original reversing mechanism, the operator can easily reverse the originals, thereby allowing easy two-side copy.

It is still another object of the present invention to provide a method and apparatus for two-side image formation, which can produce a required number of sets of copies even if the capacity of an intermediate tray is smaller than the number of copies to be produced.

BRIEF DESCRIPTION OF THE DRAWINGS

FIGS. 2A, 2B, 3A, 3B and 3C are views showing the page order of originals, one-side copied sheets and two-side copied sheets;

FIG. 6 is a perspective view of an intermediate tray;

FIG. 7 is a side view of a separator;

FIG. 8 is a perspective view of the separator;

FIG. 9 is an enlarged perspective view of a single separator;

DESCRIPTION OF THE PREFERRED EMBODIMENT

The preferred embodiments of the present invention will now be described in detail.

Figure 4:
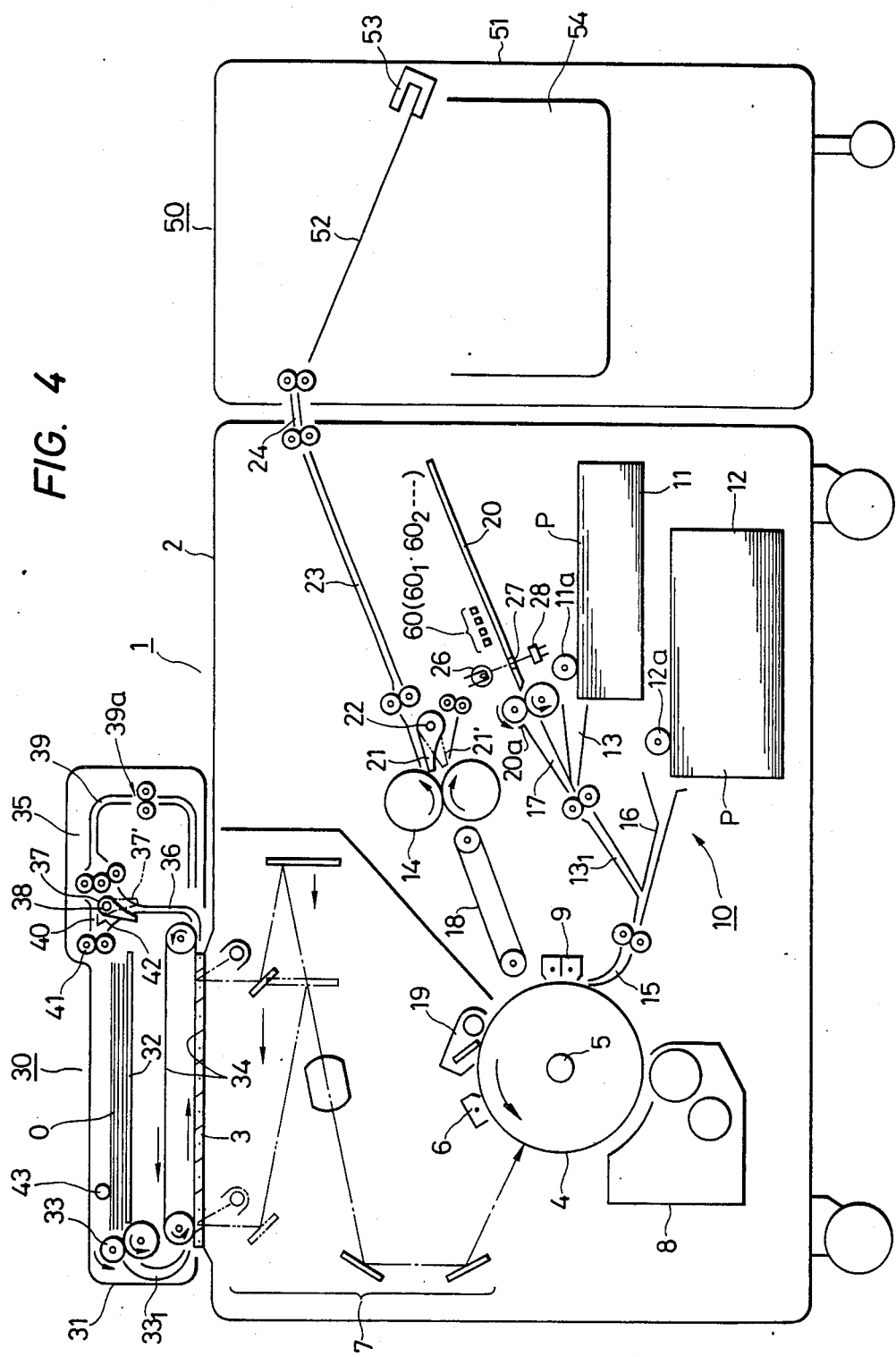
FIG. 4 is a schematic sectional view showing an image formation apparatus having a two-side copy function.

The description will be made with reference to a case of a two-side copying machine. FIG. 4 shows the schematic construction of an example of a copying machine having a two-side copy function. The two-side copying machine of the present invention has an automatic original feeding, copying and bookbinding processing system comprising a combination of:

(a) a copying machine main body 1 having copy process equipment;

(b) an automatic original feeder of recycle type (to be referred to as an RDF hereinafter) 30 for automatically feeding and discharging the originals (sheet originals) on or from an original glass table 3 of the copying machine main body 1; and (c) an automatic stapler (automatic bookbinder) 50 which, when producing one or a plurality of sets of copies, is actuated every time one set of copies is discharged and stacked from the copying machine main body 1 onto a discharge tray 52 so as to bind the set of copies with staples or the like. However, the present invention is not limited to a combination with a bookbinder but can be applied to a combination with a known stacking means such as a tray or a sorter.

(a) Copying Machine Main Body 1

The copying machine main body 1 of this embodiment is a transfer type electronic copying machine of a so-called Karlson process. The copying machine main body 1 has an outer housing 2. An original glass table 3 is fitted into an opening formed in the top surface of the housing 2. The original glass table 3 corresponds to a read position for reading an image surface of the original. A photosensitive drum 4 is rotated counterclockwise about a shaft 5, as indicated by the arrow. A charger 6 charges the photosensitive surface of the drum 4. An original scanning exposure mechanism 7 of optical system moving type has a light source for illuminating an original, a mirror, an imaging lens and the like. The mechanism 7 illuminates the lower image surface of an original set on the original glass table 3 and scans from one end of the original to the other. An electrostatic latent image corresponding to the scanned image is formed on the photosensitive drum 4 which has been charged by the charger 6.

A developing unit 8 visualized the electrostatic latent image formed on the photosensitive drum 4 by the charging and exposure as a toner image. A transfer charger 9 and a paper feed mechanism 10 are also included. The paper feed mechanism 10 used in this embodiment is of duplicate type having first and second paper trays 11 and 12 (also having rollers 11a and 12a for picking up and feeding sheets and separation pawls (not shown)). Sheets P of different types, sizes or materials are stored in the respective trays. The sheet P is picked up in synchronism with the rotation of the drum 4 from the first or second paper tray 11 or 12 selected by a selection switch and is transferred to a transfer charger 9. When the first paper tray 11 is selected, the paper therein is picked up upon rotation of the roller 11a and is supplied to a transfer portion between the drum 4 and the transfer charger 9 along a sheet path 13, a sheet path $13_1$, and a sheet path 15. Then, the toner image on the photosensitive drum 4 is transferred onto the sheet P. When the second paper tray 12 is selected, the paper sheet stored therein is fed to the transfer charger 9 along a sheet path 16 and the sheet path 15.

The sheet passed beyond the transfer charger 9 is separated from the photosensitive drum 4 and is conveyed by a convey unit 18 to a fixing unit 14. The image on the sheet is thus fixed. A drum cleaner 19 removes any residual toner from the photosensitive drum from which the sheet has been separated.

An intermediate tray 20 temporarily stores sheets, having had images copied on one side of which in the two-side copy mode. A copy sheet passage change plate 21 is arranged at the outlet port side of the fixing unit 14. The change plate 21 is selectively pivoted about a shaft 22 between a first position indicated by the solid line and a second position 21 indicated by the alternate two long and one short dash line.

In the copy operation in the one-side copy mode, the change plate 21 is held at the second position 21'. The sheet on one side of which an image has been formed (one-side copy) passing from the change plate 21. The sheet is then guided along a discharge path 23 leading to a discharge port 24 and is discharged through the port 24 into the discharge tray 52 of the automatic stapler 50.

In the two-side copy mode, the change plate 21 is at the first position. The sheet on one side of which an image has been formed from the fixing unit 14 is passed at the side of the lower surface of the change plate 21 and is discharged into the intermediate tray 20. The one-side copy sheet which has been temporarily stored in the intermediate tray 20 is then subjected to the other side copy cycle wherein it is fed to the transfer charger 9 again by the rotation of a pickup roller 20a along a sheet path 17, the sheet path 13', and the sheet path 15. Thus, an image is transferred onto the other side of the sheet. The sheet is then separated from the photosensitive drum 4 and is supplied to the fixing unit 14. The image on the other side of the sheet is fixed and the sheet is produced from the fixing unit 14 as a two-side copy. Before the two-side copy is produced from the fixing unit 14, the change plate 21 has been changed to the second position 21'. Then, the copy is passed above the change plate 21, enters the discharge path 23, and is discharged into the discharge tray 52 in the automatic stapler 50.

(b) RDF 30

The RDF 30 has an outer housing 31 which can stand upright on or be inclined on the original glass table 3 of the copying machined main body 1. The housing 31 has therein an original table 32, a pickup/feed mechanism 33 for picking up and feeding one original at a time, a sheet guide $33_1$, an original feeding endless belt (full-width belt) 34, an original return sheet path mechanism 35, and so on.

When the outer housing 31, that is, the RDF 30 is inclined with respect to the original glass table 3. the lower surface of the belt 34 is urged against the full-width of the upper surface of the original glass table 32 at a suitable pressure. Originals O are set on the original table 32 (only one original O may be placed at any one time.)

When a copy start signal is received, the original (in this embodiment, the lowermost original) on the original table 32 is picked by the mechanism 33 and is fed into the sheet path mechanism 35. In this connection, an auxiliary roller for feeding the original on the original table 32 to the mechanism 33 may be incorporated. The picked up original O is guided to a position at the left side of the original glass table 3. The sheet is slid and conveyed by the belt 34 to the right side of the table 3 through a gap between the original glass table 3 and the belt 34 driven counterclockwise indicated by the arrow after its side facing upward on the table 32 is reversed. When the leading end of the original has reached a reference position near the right side of the glass table 3, the driving operation of the belt 34 is stopped. Thus, the original is picked up and set at a predetermined position on the original glass table 3. When the belt 34 is stopped, the original facing down on the original glass table 3 is subjected to a copy operation by the copying machine main body 1.

When the exposure operation for the original is completed at the side of the copying machine main body 1, the belt 34 is driven again so that the exposed original is conveyed along a sheet path 36 of the original return sheet path mechanism 35. Meanwhile, the next original is picked up and fed from the original table 32, and is conveyed by the belt 34 onto the original glass table 3.

The mechanism 35 has a passage change plate 37 which is pivotal about a shaft 38 between a first position indicated by the solid line and a second position 37' indicated by an alternate long and two short dashed line. When the change plate 38 is at the first position, the exposed original conveyed along the sheet path 36 from the original glass table 3 is guided to a switch back sheet path 39 as a reversal unit. When the trailing end of the original is completely inside the sheet path 39, a switch back operation is performed. Thus, the original is returned onto the original glass table 3 with the image surface facing downward along a sheet path 40 and a pair of discharge rollers 41. A pair of reversible rollers 39a are arranged in the switch back sheet path 39. When the change plate 37 is at the second position 37', the exposed sheet guided along the sheet path 36 is returned onto the original glass table 3 with the image surface upward via a sheet path 42 and the discharge rollers 41.

When the original is a thick book or when an original is manually set on the original glass table 3, the RDF 30 is rendered to stand upright. Then, the operator places the original on the original glass table 3 with the image surface to be copied facing downward. Then, the operator sets the RDF 30 horizontally again as an original cover.

(c) Automatic Stapler 50

The automatic stapler 50 of this embodiment has an outer housing 51. The housing 51 has therein the discharge tray 52 for receiving copies from the copying machine main body 1, a stapling mechanism 53, a stacker 54, and the like. The copy receiving port of the stapler 50 is aligned with the discharge port 24 of the copying machine main body 1.

The copies sequentially discharged from the copying machine main body 1 to the discharge tray 52 are stacked (ordered) therein such that the corresponding sides overlap each other. When the last sheet among a set of sheets copied is discharged in the tray 52 and is in order, the stapling mechanism 53 is actuated to staple and bind the set of sheets. The stapled sheets are automatically discharged into the stacker 54 by an inclining movement or the like of the tray 52 or the like.

Figure 1B:
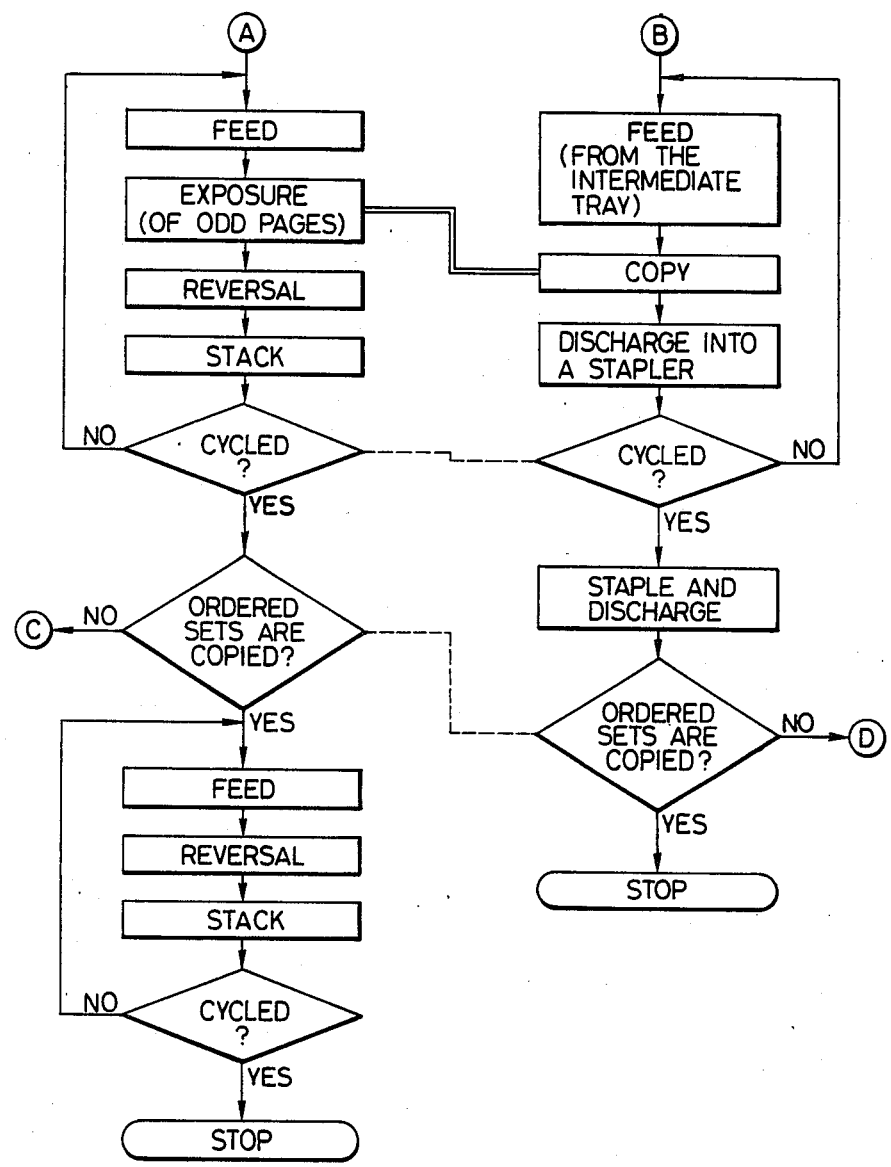
FIG. 1 composed of FIGS. 1A and 1B is a flow chart of a conventional two-side image formation sequence.
Figure 5A:
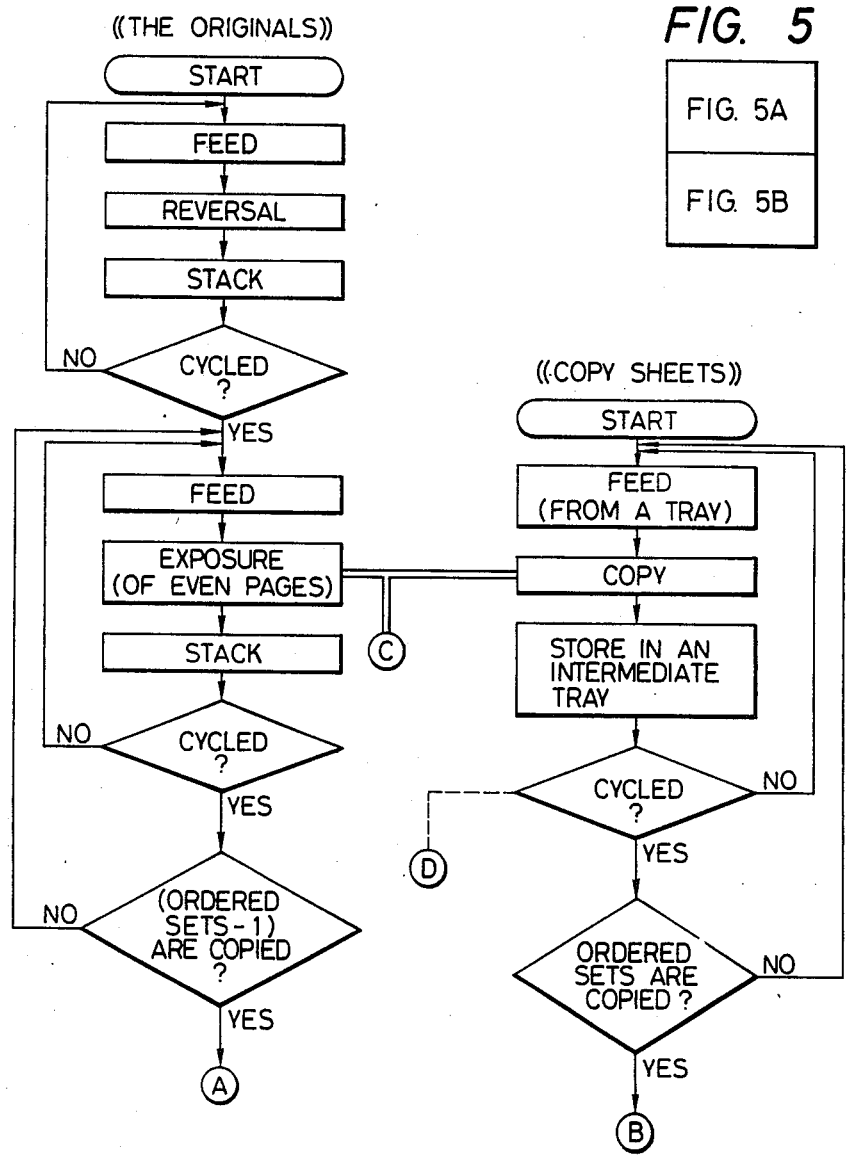
FIG. 5 composed of FIGS. 5A and 5B is a flow chart of a two-side copy in an apparatus according to an embodiment of the present invention.
Figure 5B:
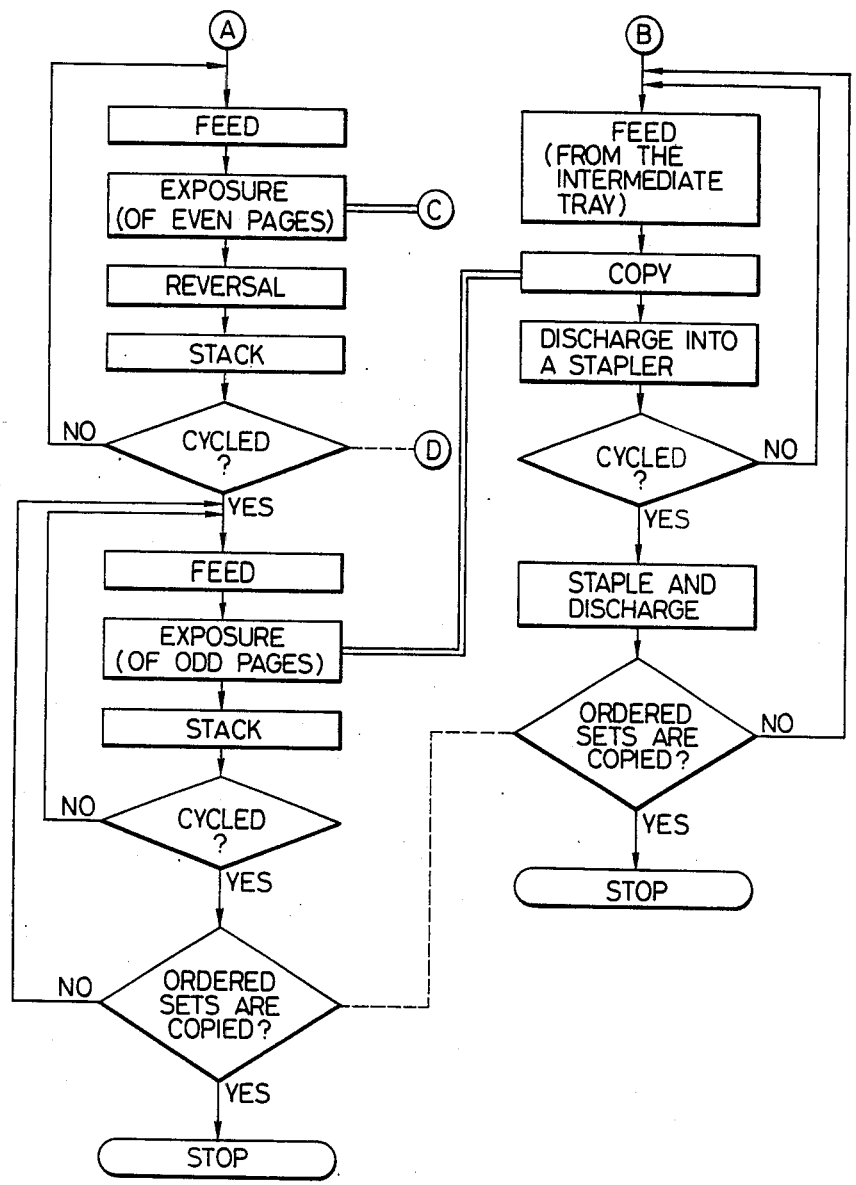

FIG. 5 shows a schematic flow of originals and sheets in the embodiment of the present invention. As in the case described with reference to FIG. 1 (second method), originals $O_1$ to $O_5$ stacked in the page order as shown in FIG. 2A are sequentially picked up and fed from the lowermost original $O_5$. The sheet is passed above the original glass table 3 without performing an exposure operation, reversed and returned from the sheet path mechanism 35 to the original table 32. This operation is performed for each of the originals. Then, the originals are stacked in the page order as shown in FIG. 2B. The originals are then picked up and fed from the lowermost one onto the original glass table 3. Then, the 10th page (even page) as the final page faces the original glass table 3. The copy operation for the 10th page is executed, and the copied sheet is stored in the intermediate tray 20. After the exposure, the original is not reversed, and is returned to the original table 32. This operation (copy operation for even page of each original) is performed for each of the originals. Then, sheets P' with even page images formed thereon are stacked in the intermediate tray 20 in the page order as shown in FIG. 3A. The return originals on the original table 32 are fed from the lowermost one and copy operations are performed. The copies are stored in the intermediate tray 20 and this operation is repeated by a number of times equal to the number of required sets of copies minus 1. When the final set copy operation is started, the exposed originals are reversed and are returned onto the original table 32.

When the copy operation for copying the image on the last even page is completed, the originals are stacked on the original table 32 in the order as shown in FIG. 2A. Meanwhile, a required number of sets of sheets P1', P2' and P3' (3 are shown in the drawing) for which image formation for even pages has been completed are stacked in the intermediate tray 20, as shown in FIG. 3C.

When the copy operation for the required number of sheets for the even pages of the original has been completed, the originals stacked on the original table 32 in the page order shown in FIG. 2A are fed from the lowermost one. Then, the odd pages of the originals face the original glass table 3. The original is conveyed. Meanwhile, the sheets on which even page images have been formed are sequentially fed from the intermediate tray 20 and copying operations are performed. The copied sheets (two-side copies) are sequentially discharged into the tray 52 of the stapler 50. When this operation is repeated until the two-side copy operation has been performed for each of the originals, the copied sheets P having the same page order as that of the original shown in FIG. 3B are stacked on the tray 52 of the stapler 50. These copies p corresponding to one set are stapled by the stapling mechanism 53, and discharged into the stacker 54. The tray 52 can then receive the next sheets. The exposed originals are not reversed and are returned to the original table 32 along the sheet path 36 and the sheet path 42 of the original return sheet path mechanism 35. Then, the originals are stacked in the page order as shown in FIG. 2A.

When the above operation has been repeated a required number of times, the required number of sets of copies is produced. The originals are finally returned onto the original table 32 in the same page order as before the copy operation, that is, in the order shown in FIG. 2A.

According to this embodiment, the number of reversal of originals is $2 \times n$ where n is the number of originals. Therefore, the originals are not damaged as frequently as in the conventional case. Since the number of reversals of the originals is small, the operation required by an operator to achieve two-side copy is decreased even with an automatic recycle original feeder without a reversing mechanism.

FIG. 6 is a view showing the structure of the intermediate tray 20 according to the embodiment of the present invention.

In the two-side copy according to a conventional method, only one sheet P' (FIG. 3A) having an image on one side can be stored in an intermediate tray. In this case, the means for detecting the sheet in the intermediate tray need only detect the presence/absence of the sheet in order to prevent overlapped feed of originals or sheets. That is, when the correspondence between the cycle of originals and the presence/absence of the sheets is monitored, the overlapped feed of originals or sheets can be determined. This correspondence is indicated by the dotted line in the flow shown in FIG. 1. The presence/absence of sheets can be easily detected with a photosensor or a microswitch.

However, in the case of this embodiment, since a required number of sets of sheets P1', P2' and P3' (FIG. 3A) are stored in the intermediate tray 20 after one-side copy, boundaries a between the respective sets of sheets corresponding to one cycle of originals must be discriminated. This is indicated by the dotted line in FIG. 5 and is attributed to the following reason. When an overlapped feed of sheets is caused in the tray 11 or 12 during the one-side copy, and the overlapped sheets are separated during the two-side copy, the subsequent sheets will have wrongly ordered pages. If the boundaries a between the sets of sheets P1', P2' and P3' on the intermediate tray 20 can be detected, the set including the overlapped sheets is disturbed in order but any other set is not disturbed in order. For example, if the sheets are overlap-fed during one-side copy, one extra sheet remains after copying the corresponding set of sheets. This remaining sheet can be conveyed without copy operation and can be used for the next copy operation. In order to allow this according to the present invention, a means for detecting the boundaries a between the sets of the one-side copied sheets must be incorporated.

The means for detecting the boundaries a may comprise separators corresponding to the boundaries a of the sets of sheets P1', P2' and P3'. This method can also be used for detecting one cycle of originals in the flow shown in FIG. 1 or 5. When one set of sheets P1' are stacked in the intermediate tray 20 as shown in FIG. 6, a separator 60 is placed on the uppermost sheet of the set of sheets P'. Sheets of the next set are stacked on the separator 60. When the sheets in the intermediate tray 20 are sequentially fed from the lowermost one to the transfer unit 9 and the separator 60 is at the lowermost position, the separator 60 naturally drops since the sheet which has been supporting it has been removed. If a means for detecting the drop of this separator 60 is incorporated, the boundary a between the sets of sheets can be detected. If a plurality of separators 60 are used, a plurality of boundaries a can be detected.

Referring to FIG. 6, upper and lower pickup/feed rollers 61 and 62 are arranged such that the upper rollers 61 slightly overlap the lower rollers 62 in the radial direction. The upper and lower rollers 61 and 62 are driven in the direction indicated by the arrows. The sheets in the intermediate tray 20 are sequentially fed from the lowermost one by the rollers 61 and 62. A guide 63 guides the leading end of the sheet, and guides 64 regulate the sides of the sheet. Note that the front guide 64 is not shown in FIG. 6.

FIG. 7 shows a case wherein a plurality of separators 60 are used to detect a number of boundaries a between the sets of sheets. In the example shown in FIG. 7, three sets of sheets P1', P2', and P3' are separated by separators $60_1$, $60_2$, and $60_3$ and are stacked on the intermediate tray 20. FIG. 8 shows motors $65_1$, $65_2$, $65_3$, ..., for driving the separators $60_1$, $60_2$, and $60_3$, and sensors (photosensors) $66_1$, $66_2$, $66_3$, ..., for detecting the positions of the corresponding separators.

A signal is generated at a timing (generated by a control circuit when completion of the copy operation on the final set of sheets is counted by a preset sheet counter (not shown)) when the final sheet of the first set of sheets P1' is discharged onto the intermediate tray 20 and is placed on the uppermost sheet which has been stacked in the tray 20. In response to this signal, the first motor $65_1$ is energized to rotate the first separator $60_1$ in the direction of the arrow and to put it on the uppermost sheet of the first set of sheets P1'. Subsequently, the second set of sheets P2' is stacked thereon. When the final sheet of the second sheet is stacked in the tray 20, the second motor $65_2$ is energized to rotate the second separator $60_2$ and put it on the uppermost sheet of the second set of sheets P2'. In this manner, every time a set of sheets is discharged, a corresponding separator is pivoted and placed on the uppermost sheet of the corresponding set. Thus, the separators are inserted at the boundaries a between the respective sets of sheets P1', P2', and so on.

The separators $60_1$, $60_2$, ..., in the free state are suspended downward as indicated by the solid lines in FIG. 8. The distal ends of the downwardly extending separators shield the light paths of the photosensors $66_1$, $66_2$, .... When the separators $60_1$, $60_2$, ..., are sequentially pivoted to separate the sets of sheets P1', P2', ..., shielding of the light paths of the corresponding photosensors 66a is released upon pivotal movement of the separators $60_1$, $60_2$, .... When feed out of the sheets on the intermediate tray is completed, as each set of sheets is fed out, the corresponding separator is pivoted downward by its own weight and sheilds the light path of the corresponding sensors. Thus, completion of feed out of the set of sheets is detected.

FIG. 9 shows a part for rotating each separator 60. A unidirectional rotation transmitting means 68 is interposed between a shaft 67 of a motor 65 and the separator 60. The means 68 may or may not transmit power exceeding a predetermined torque. First, the shaft 67 is rotated in the direction of the arrow by the motor 65. Then, the separator 60 receives power via the means 68, rotated in the direction indicated by the arrow, and placed on the uppermost sheet. Thereafter, the means 68 slips with respect to the rotating shaft 67. Thus, even if the motor 65 is rotated, the separator 60 is received by the sheet and is stopped. After rotating by a certain extent, the motor 65 is stopped. When one set of sheets is fed from the intermediate tray 20 and the final sheet of this set is fed out, the separator 60 is no longer supported and naturally drops by its own weight in the direction indicated by the arrow. At this time, the means 68 does not transmit a rotational force to the shaft 67, as the separator 60 can rotate by its own weight even if the shaft 67 of the motor 65 is not rotated. Since only the separator 60 of a light weight need be rotated, the motor 65 can be of compact type. Therefore, a plurality of motors can be arranged as shown in FIG. 8.

In this manner, by using a plurality of separators 60, the means 65 for driving the separators 60, and the means 66 for detecting the separators 60, the boundaries a between the plurality of sets of sheets P1', P2', ... can be detected.

A means for detecting an image pattern on the sheets can be arranged before and after the intermediate tray 20 as a means for detecting one set of sheets. The image pattern corresponding to each set of sheets can be stored and compared with an image pattern of each sheet.

In the above embodiment, all of a required number of sets of sheets P1', P2', ... are stored in the intermediate tray 20. However, if the number of sheets is large and exceeds the capacity of the tray 20 or the number of separators $61_1$, $61_2$, ..., the sheets may be divided, as will be described below.

The present invention is not limited to the above embodiment. For example, the reversing mechanism of the originals can be arranged at a position between the pickup position of the originals and the original table. Furthermore, the originals can be picked up from the uppermost one in place of from the lowermost one. The intermediate tray can stack therein sheets on which odd page images have been formed.

Figure 10:
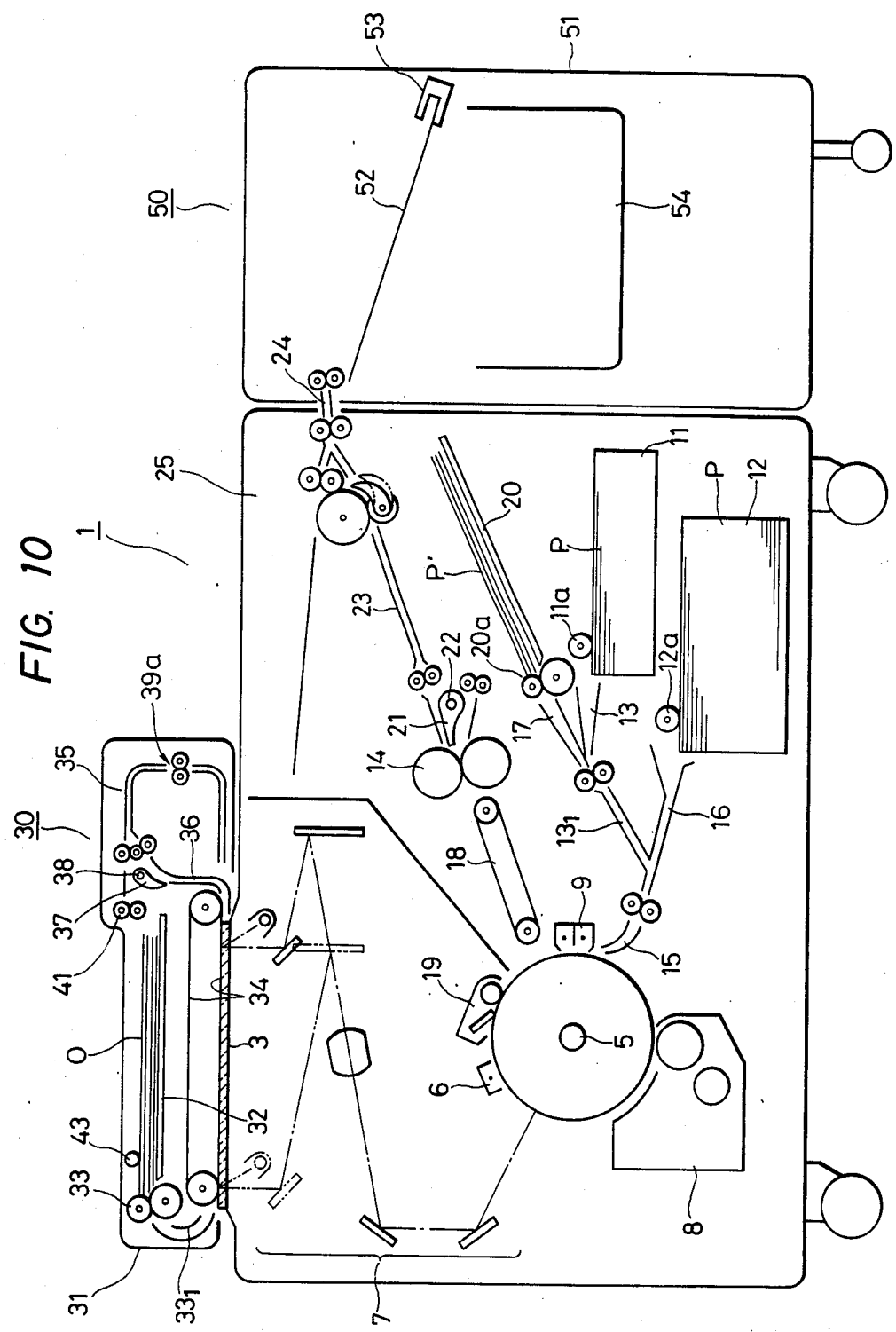
FIG. 10 is a schematic sectional view according to a modification of the present invention.
Figure 11A:
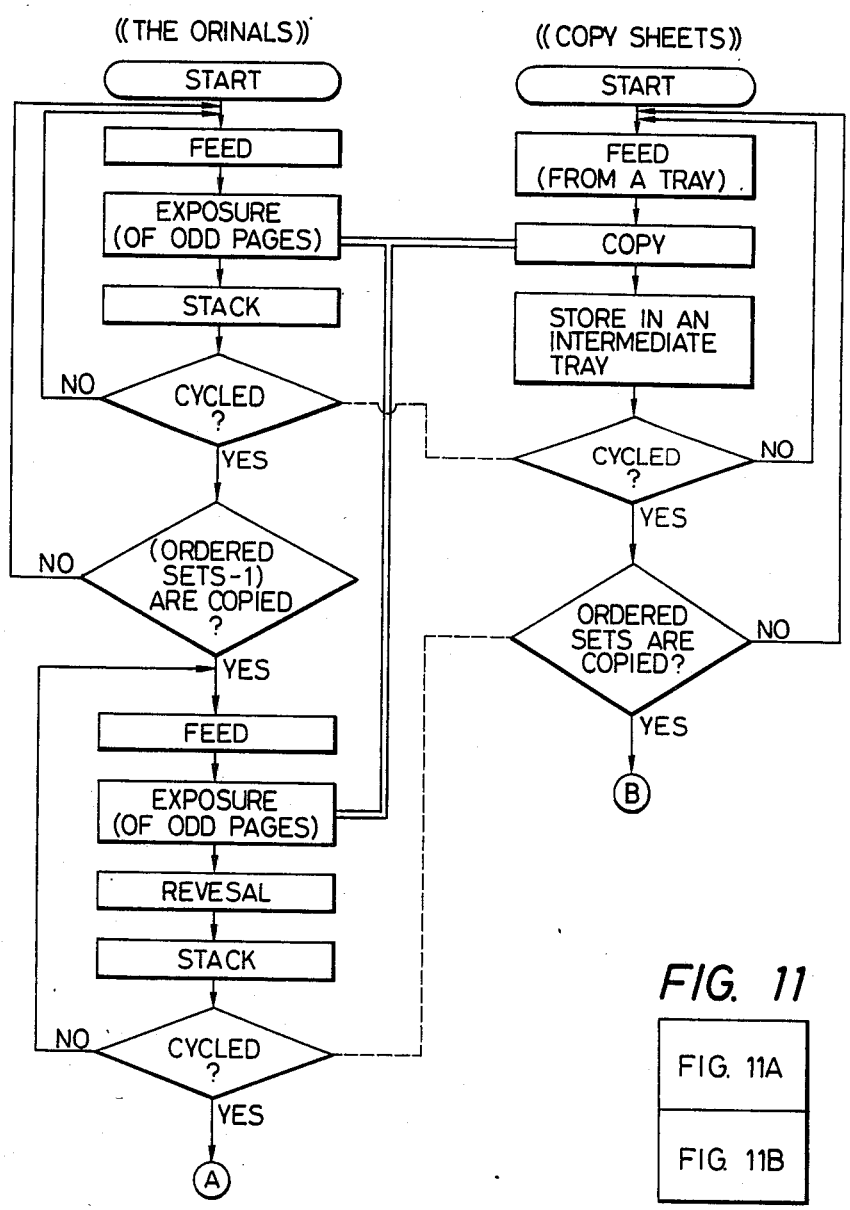
FIG. 11 composed of FIGS. 11A and 11B is a flow chart of a two-side copy according to the apparatus shown in FIG. 10.
Figure 11:
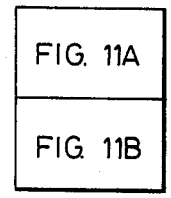
Figure 11B:
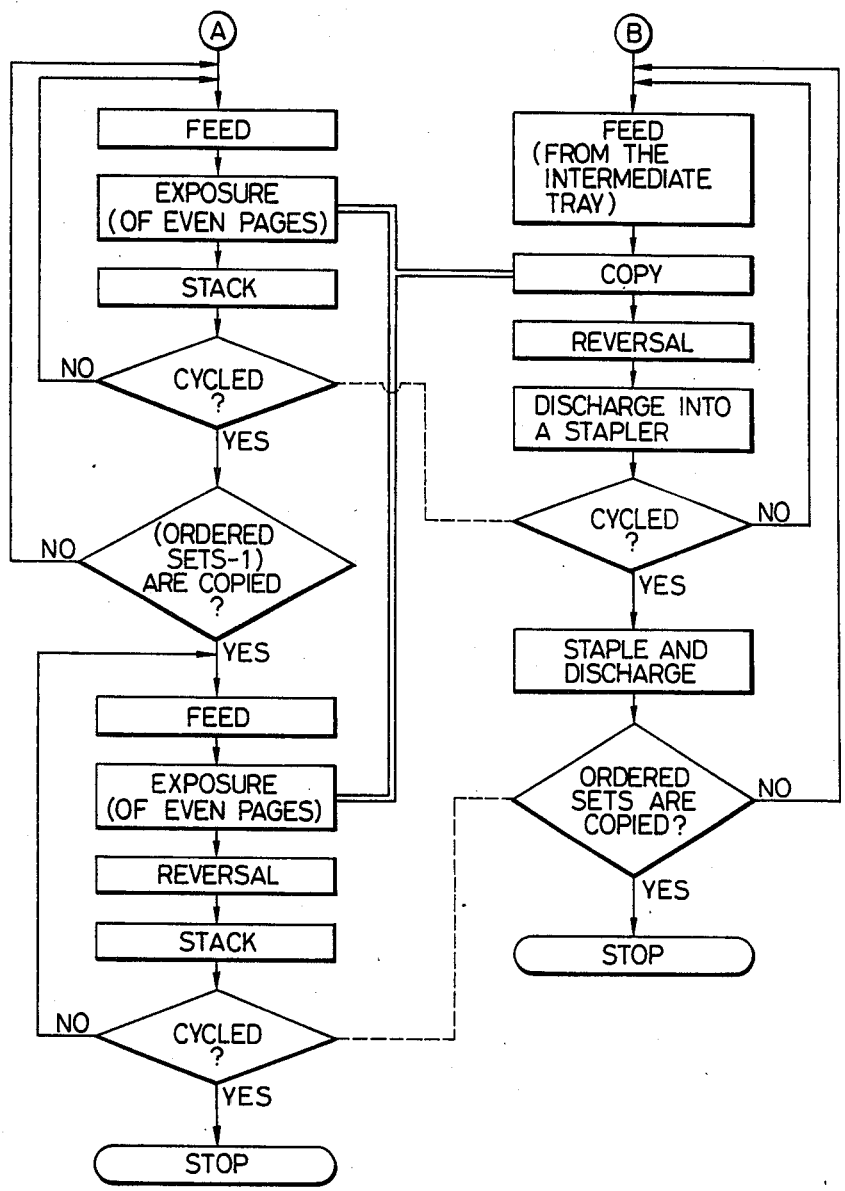

When the copying machine main body has a reversing mechanism 25, as shown in FIG. 10, the flow as shown in FIG. 11 may be adopted in place of the flow shown in FIG. 5. In other words, the originals are not reversed and fed onto the original glass table 3 to perform copy operations from odd pages. The operation for returning the originals to the original table 32 without reversing is repeated. When the number of sets corresponding to the required number of sets minus 1 is completed, after originals are copied they are reversed and returned to the original table 32. When the next original is fed, the even page side of the original faces downward on the original glass table 3 and the image of the even page is formed on the second side of the sheet, which already has the image of an odd page on its other side In this case, the originals are not reversed and returned. However, the sheets after the second side copy, that is, the two-side copied sheets are reversed by the reversing mechanism 25 and are discharged to the side of the stapler 50. When this operation is performed, a set of copies P" as shown in FIG. 3B is stored in the tray 52 of the stapler 52. In this manner, the same copy cycle is repeated to produce a set of a required number of two-side copies.

When the originals are reversed and returned after the second side copy, they can be stacked in the same order as before the copy operation.

In both of the apparatuses shown in FIGS. 4 and 10, the originals are conveyed back and forth between the original table 32 and the original glass table 3. Then, the sides of the originals are reversed via the sheet path 35. However, the present invention can be similarly applied to cases wherein originals are not fed back and forth, copy operations are started from the originals of smaller page numbers, and so on.

Another embodiment of the present invention will now be described. In the embodiment to be described below, even if the capacity of an intermediate tray is smaller than the number of copies to be produced, the operation of the machine can be controlled such that a required number of copies can be finally produced.

Control of the apparatus will now be described with reference to a case wherein the total number of sheets required exceeds the capacity of an intermediate tray 20, and a case wherein the number of sheets exceeds that of separators 60 ($60_1$, $60_2$, . . . ) of the intermediate tray 20.

Figure 12:
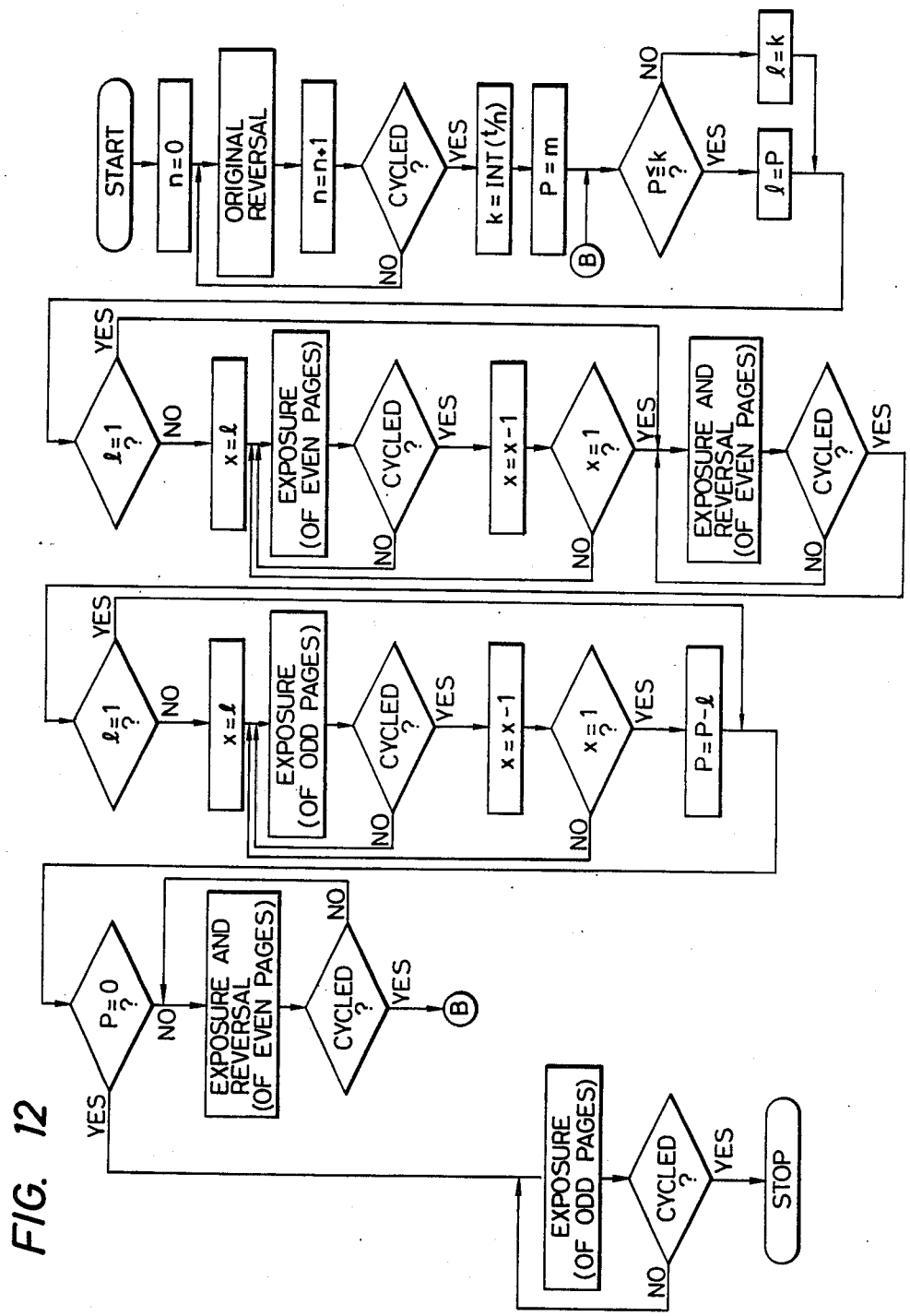
FIG. 12 is a control flow chart in the flow of FIG. 5 in which the number of copies to be produced exceeds the maximum capacity of the intermediate tray.

(a) When total number of sheets to be copied exceeds capacity of intermediate tray When $t \geq n \times m$ where t is the capacity of the intermediate tray 20, n is the number of originals O ($O_1$, $O_2'$, . . . ), and m is the ordered number of sets of two-side copies (FIG. 14: 72), the copy operation can be continuously performed in accordance with the flow shown in FIG. 5. However, when $t < n \times m$, divisional copying operation must be performed. FIG. 12 is a flow chart for performing the divisional copy control. In FIG. 12, the parts common to those shown in FIG. 5 are simplified and the flow of the sheets corresponding to originals is omitted. However, the copy operation corresponding to the even pages is perfomed for sheets supplied from a paper tray, and the copy operation corresponding to the odd pages is performed for sheets supplied from the intermediate tray.

An example of the actual copy operation will be described with reference to the flow chart shown in FIG. 12. The RDF 30 also has an original recycle detecting means 43 (FIG. 4) which serves a similar purpose to that of the separators 60 of the intermediate tray 20. The means 43 counts the number n (15 originals in this case) when the originals are reversed for the first time. When the capacity of the intermediate tray 20 used is represented by t (50 in this case) and k given by $k = INT(t/n)$ is calculated, the value of INT for satisfying $k = 3$ is an integer obtained by truncating the fractions. In other words, the copy operation up to 3 sets of sheets can be performed continuously in accordance with the flow chart shown in FIG. 5. The number of sets of copies ordered by the operator from the control panel is represented by m (7 in this case) and the remaining number of sets to be still produced is represented by p. In this case, the initial value of p is m, i.e., 7, and p (=7) is greater than k (=3). Therefore, divisional copying must be performed. When the number of sets of sheets which can be continuously copied within a single continuous operation is give by l, we have $l = 3$. Since the operation for preparing the number of sets which can be continuously produced within the single continuous operation is the same as that shown by the flow chart shown in FIG. 5, it will only be described briefly. Sheets P for the ordered number of sets l which can be produced within a single continuous operation are stacked on the intermediate tray 20. However, when the current set of sheets is the final set of sheets, the originals which have been exposed are reversed, discharged and stacked to allow copying the odd pages. Copy operation of the odd pages are performed on the sheets which are stack on the intermediate tray 20 and on which images of even pages have been formed. In this case, the final set of sheets is reversed after exposure, discharged, and stacked to allow the copy operation of the next even pages. When this is completed, the intermediate tray 20 is empty.

When the above operation is performed, the remaining number p of sets of sheets to be produced is $p = (p - l) = 7 - 3 = 4$. That is, four more sets of copies must still be produced. In this case, p (=4) is larger than k (=3), and the entire copy operation cannot be performed within a single continuous operation. Therefore, the three sets of sheets are produced in the same manner as described above.

When $p = p - l$ is calculated, $p = 4 - 3 = 1$. That is, the remaining number p of sets of sheets to be produced is 1. Since $p \leq k$, $l = 1$. In this case, when the even page images are exposed, the originals after exposure are reversed, discharged and stacked as in the case of the final set of sheets to allow exposure of the odd pages. Exposure of the odd pages is then performed. In this case, since the ordered number of sets of copies have been produced, the copy operation of the next even pages is not necessary. The originals not reversed, discharged and stacked, but are simply discharged and stacked. When $p = p - 1$ is calculated, $p = 1 - 1 = 0$. When $p = 0$, after the exposure, the originals are discharged directly. In this manner, an ordered number of sets of copies can be produced while minimizing the number of reversals of originals required.

A case will now be considered wherein $n = 35$, $m = 5$, and $t = 50$. Then $t < n \times m$, and $k = INT (50/35) = 1$. That is, each set of copies must be produced individually. This operation is the same as the conventional method. When this operation is explained in accordance with the flow shown in FIG. 12, since $p = m = 5$ and $k < p$, $l = 1$. Therefore, except for the final set of sheets, the originals are reversed after exposure, discharged and stacked.

When the number of originals n exceeds the capacity t of the intermediate tray, the origignals are divided and copied or a display indicating that two-side copy cannot be performed is displayed. However, since this is not directly associated with the present invention, it will not be described.

A description will now be made with reference to the flow chart shown in FIG. 11. Although the flow chart is not shown, the operation is basically the same and can be understood easily. In this case, the copy operation is performed from the odd pages. Unlike the case of FIG.

5, the number of originals cannot be counted every time the originals are reversed. However, the originals can be counted by feeding them without performing exposure. Alternatively the originals can be counted when the exposure is performed during the exposure for the copy operation of odd pages.

When the number of originals is counted, the number of originals which can be continuously copied is determined. Thereafter, the same copy operation can be repeated a required number of times.

Figure 13:
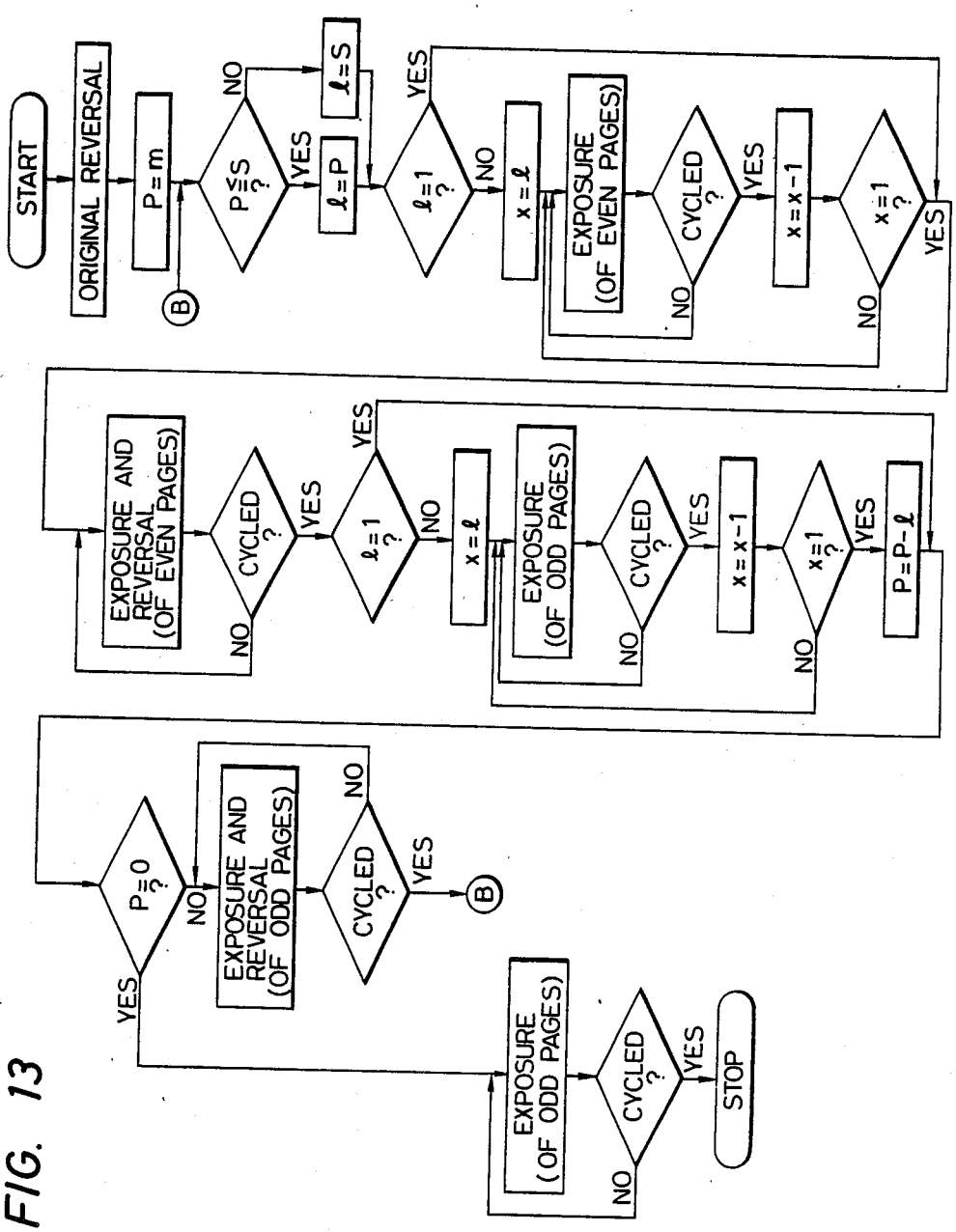
FIG. 13 is a control flow chart in the flow of FIG. 5 in which the number of copies to be produced exceeds the number of separators in the intermediate tray.

(b) When number of sets of copies exceeds number of separators of intermediate tray The number of boundaries between sets of sheets in the intermediate tray 20 which can be detected (the number of separtors 60) is represented by S, the number of two-side originals is represented by n, and the number of ordered sets of two-side copies is represented by m. Then, when $S \geq m$, the entire copy operation can be performed within a single continuous copy operation in accordance with the flow chart shown in FIG. 5. However, when $S < m$, divisional copy operation must be performed. FIG. 13 shows a control flow chart in this case. The flow chart shown in FIG. 13 is basically the same as that shown in FIG. 12, and major differences will only be described below. A case will be described wherein $m = 13$ and $S = 5$. In this case, $p = m = 13$ and $p > S$. Then, the number of sets of sheets which can be copied is 5 which can be discriminated by the separators. Thus, $1 = 5$, and five sets of two-side copies are continuously produced as in the case shown in FIG. 5. Thereafter, $p = p - 1$ and $p = 8$, and another operation for producing five sets of two-side copies is performed. Thereafter, $p = p - 1$ and $p = 3$, and $p < S$, i,e., $1 = 3$ Then, three sets of copies are produced next. When odd pages of the final sets of sheets are copied, the originals are not reversed, but are directly discharged and stacked. In this manner, when the number of sets of copies to be produced exceeds the nubmer of separators, the number of reversals of the originals can be minimized.

The above also applies to the flow chart shown in FIG. 11.

Referring to FIG. 4, in the apparatus which has, in addition to the separators 60 in the intermediate tray 20 as the sheet detecting means, a light-emitting element 26 arranged above the intermediate tray 20, an optical window 27 formed in the bottom of the intermediate tray 20, and a light-receiving element 28 arranged below the intermediate tray 20, the apparatus can discriminate the number of sets of sheets which is the sum of the number of separators plus one. In this case, S is the number of separators plus 1.

When the value of n is small such as in the case of $n = 2$ and $m = 20$, the number of reversals of originals cannot be reduced much even according to the present invention. In this case, each separator can be used to discriminate a predetermined number sets of sheets, so that the number of reversals of originals can be reduced. However, in this case, since the overlapped feeding of originals cannot be immediately detected, frequency of wasting sheets is increased. Whether to use a separator for each set of sheet or to use a single separator for a predetermined number of sets of sheets can be determined in accordance with the arrangement of each apparatus and the like. However, when the value of n is 2 to 3 and m is a value 5 times or more than that of S, it is preferable to use a single separator of several sets of sheets. When the separators are used such that a single separator is used for several sets of sheets, the number of such several sets of sheets to be discriminated by a single separator can be determined in accordance with a table which stores suitable numbers of sets of sheets in accordance with various values of n, m and S.

In the above description, the divisional copy operation in the cases of (a) and (b) is described separately. However, this has been done for the sake of easy understanding and the control mode of the copying machine must satisfy the conditions for both cases. For example, a case will be considered wherein $n = 6$, $m = 30$, $t = 50$, and $S = 5$. In this case, $t < n \times m$, and $k = INT(50/6) = 8$. Therefore, 8 sets of sheets for copy operation each is calculated from the capacity of the intermediate tray. However, if $S = 5$, only five sets of sheets can be produced within one continuous copy operation. In this case, the copy operation must be performed in accordance with the flow shown in FIG. 13. Assume a case described with reference to the flow chart shown in FIG. 12, wherein $n = 15$, $m = 7$, $t = 50$ and $S = 5$. In this case, $k = INT(50/15) = 3$ is obtained and becomes smaller than S ($= 5$). Therefore, the copy operation is performed in accordance with the flow shown in FIG. 12.

In the above embodiment, two-side copy operation is performed for a two-side original. However, multiple copy operation can be performed by using a two-side original. In other words, images on the upper and lower surfaces of the original can be easily copied on a single side of the sheets.

Figure 14:
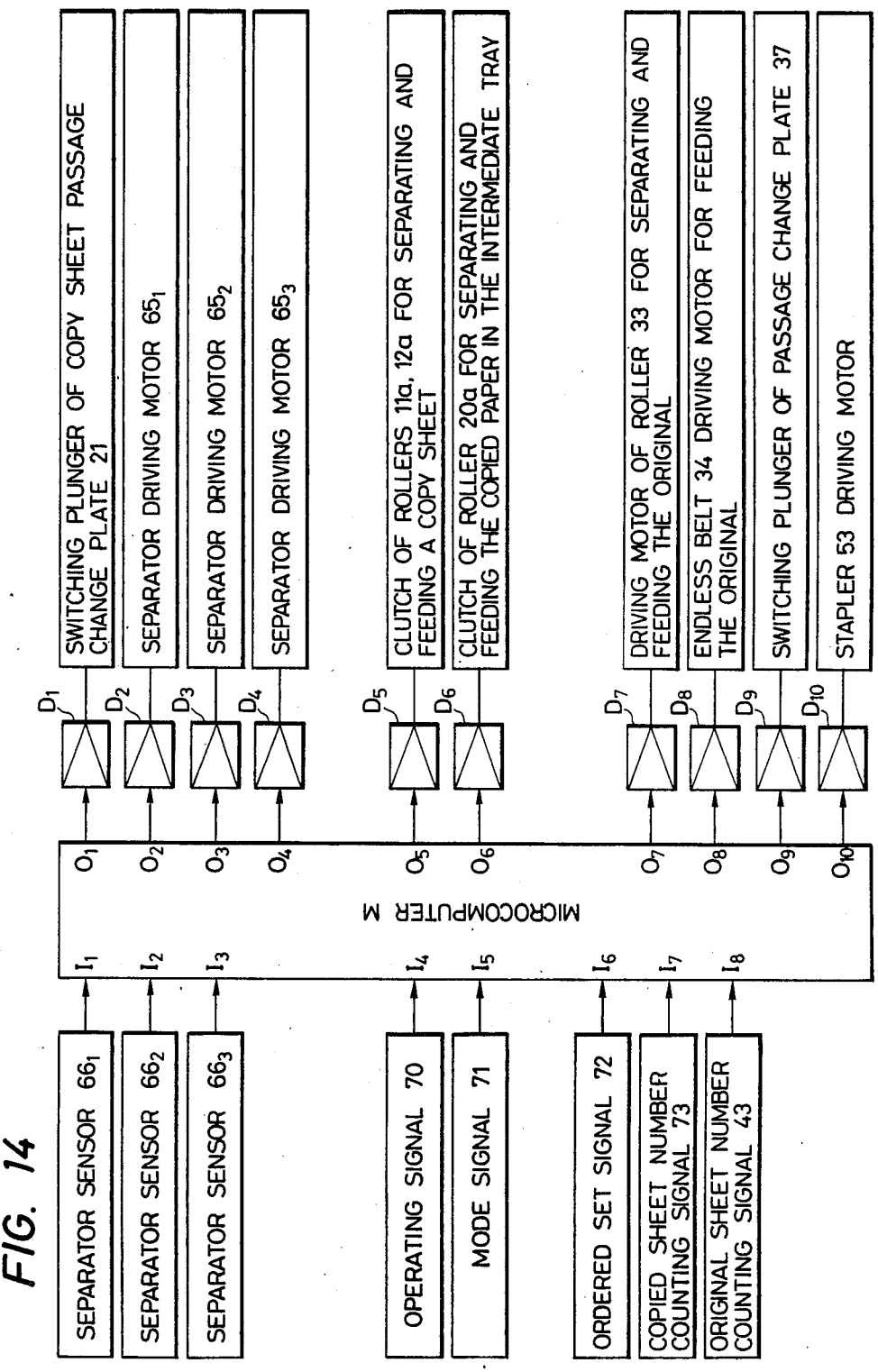
FIG. 14 is a block diagram of a control circuit for performing the sequence operation according to the present invention.

FIG. 14 is a block diagram of a control circuit for performing a sequence of each embodiment of the present invention. This control circuit mainly comprises a known one-chip microcomputer M incorporating a ROM and a RAM. The control circuit controls the copying machine main body 1, the automatic recycle original feeder (RDF) 30 and the automatic stapler 50.

Sensor signals from the separator sensors $66_1$, $66_2$, $66_3$, . . . , an operating signal 70 such as a copy start signal and a size designation signal, a mode signal 71 such as an RDF selection signal and an automatic stapler selection signal, an ordered set signal 72 for designating the ordered number of sets, a copied sheet number counting signal 73, or an original sheet number counting signal 43, are supplied to the input ports of microcomputer M.

A switching plunger of a copied sheet passage change plate 21, separator driving motors $65_1$ to $65_3$, a clutch of rollers 11a and 12a for separating and feeding a copy sheet, a clutch of the roller 20a for separating and feeding the copied paper in the intermediate tray and the like which are arranged in the copying machine main body 1, and driving motor of the mechanism 33 for separating and feeding the original, the endless belt 34 driving motor for feeding the original and a switching plunger of the passage change plate 37 which are arranged in the RDF 30 as well as a stapler mechanism 53 driving means (e.g., motor) arranged in the stapler 50 are connected to the output ports of the microcomputer M and are controlled through drivers D1 to D10 so as to turn on/off the outputs, respectively. Data representing the capacity of the intermediate tray 20 is prestored in the microcomputer M. The typical signals with respect to the input and output ports are illustrated in the block diagram in FIG. 14. Other signals can also be supplied to the input ports of the microcomputer M and generated from the output ports thereof.

What I claim is:

1. A method for forming first and second side images of a both-side image original on both sides of a sheet, comprising the following cycles:
    an inverting cycle in which both-side image originals set on an original stacking table with the first sides thereof up are fed one by one consecutively therefrom to return to said original stacking table while inverted;
    a second side image formation cycle in which the thus-inverted originals on the stacking table with the second sides thereof up are fed one by one consecutively therefrom, second side image formation for forming the second side image of each original on one side of each sheet is cycled predetermined times corresponding to a setting number of image-formed sheet sets, and in the last cycle of the second side image formation the originals return to the original stacking table while gain inverted so as to be stacked thereon with the first sides thereof up; and
    a first side image formation cycle in which the thus-stacked originals with the first sides thereof up are fed one by one consecutively therefrom, and first side image formation for forming the first side image of each original on the other side of the corresponding sheet is cycled said predetermined time.

2. A method according to claim 1, wherein said inversion of the originals is effected by a switch-back path provided downstream of image forming station with respect to the original conveyance direction thereat.

3. An image forming apparatus for effecting a plurality of image transfer onto single sheet, comprising:
    feed means for consecutively feeding sheets one by one;
    transfer means for transferring an image onto a sheet conveyed thereto;
    intermediate storing means for storing the sheets after image-transferred by said transfer means;
    conveying means for consecutively conveying the sheets stored in the intermediate storing means one by one to said transfer means; and
    separating means for separating the sheets into a plurality of piles while the sheets are stored within the intermediate storage means.

4. An image forming apparatus according to claim 3, wherein said separating means comprises rotatable arm members, said arm members being located between the sheets to effect the separation of the sheets stored in the intermediate storing means into a plurality of piles.

5. An image forming apparatus according to claim 3, further comprising an automatic original cycle feed device, wherein said separating means executes the separation of the stored sheets each time a cycle of image formation of originals set on the automatic original cycle feed device is completed.

6. An image forming apparatus for effecting a plurality of image transfer onto a single sheet, comprising:
    feed means for consecutively feeding sheets one by one;
    transfer means for transferring an image onto a sheet conveyed thereto;
    intermediate storing means for storing the sheets after image-transferred by said transfer means;
    conveying means for consecutively conveying the sheets stored in the intermediate storing means one by one to said transfer means; and p1 detecting means for detecting overfeed of sheets by comparing the number of the sheets having been acutally stored in the intermediate storing means with the number of sheets expected to be stored therein.

7. An image forming apparatus according to claim 6, further comprising an automatic original cycle feed device, wherein said number of sheets expected to be stored in the intermediate storing means corresponds to the number of originals having been set on said automatic original cycle feed means.

8. An image forming apparatus according to claim 7, wherein after one cycle of image formation of originals set on the automatic original cycle feed device is completed, it is detected whether a sheet exists in the intermediate storing means so that overfeed of sheets may be detected.

* * * * *

UNITED STATES PATENT AND TRADEMARK OFFICE
CERTIFICATE OF CORRECTION

PATENT NO. : 4,674,866  Page 1 of 2
DATED : June 23, 1987
INVENTOR(S) : HIDETOSHI TANAKA It is certified that error appears in the above-identified patent and that said Letters Patent is hereby corrected as shown below:

Column 3, line 27, "H)" should be deleted;
line 49, after "formation" insert --.--;
line 60, "originals." should read --of originals.--.

Column 5, line 18, "visualized" should read --visualizes--;
line 57, "passing" should read --is passed--.

Column 6, line 17, "machined" should read --machine--;
line 24, "3." should read --3,--.

Column 10, line 49, "$61_1$, $61_2$" should read --$60_1$, $60_2$--.

Column 11, line 6, "side In" should read --side.  In--;
line 12, "52" (second occurrence) should read --50--;
line 41, "$O_2$'" should read --$O_2$--.

Column 12, line 43, "not" should read --are not--;
line 59, "origignals" should read --originals--.

UNITED STATES PATENT AND TRADEMARK OFFICE
CERTIFICATE OF CORRECTION

PATENT NO. :   4,674,866
DATED      :   June 23, 1987
INVENTOR(S):   HIDETOSHI TANAKA It is certified that error appears in the above-identified patent and that said Letters Patent is hereby corrected as shown below:

Column 13, line 15, "separtors" should read --separators--;

line 38, "nubmer" should read --number--;

line 56, "sets" should read --of sets--;

line 61, "sheet" should read --sheets--.

Column 15, line 18, "gain" should read --again--;

line 33, "onto" should read --onto a--.

Column 16, line 25, "and pl detecting" should read --and detecting--;

line 27, "acutally" should read --actually--.

Signed and Sealed this

Thirty-first Day of August, 1993

Attest:

BRUCE LEHMAN

*Attesting Officer*  *Commissioner of Patents and Trademarks*